United States Patent [19]

Tamura et al.

[11] 4,437,350

[45] Mar. 20, 1984

[54] VORTEX FLOW METERING APPARATUS

[75] Inventors: Hisashi Tamura; Ichizo Ito; Masashi Hirayama; Tetsuo Ando, all of Tokyo, Japan

[73] Assignee: Yokogawa Hokushin Electric Corporation, Tokyo, Japan

[21] Appl. No.: 328,078

[22] Filed: Dec. 7, 1981

[30] Foreign Application Priority Data

Oct. 6, 1981 [JP] Japan ............... 56-159060

[51] Int. Cl.³ .............................................. G01F 1/32
[52] U.S. Cl. ................ 73/861.24; 73/DIG. 4
[58] Field of Search .......... 73/861.22, 861.24, DIG. 4

[56] References Cited

U.S. PATENT DOCUMENTS 4,248,098 3/1981 Sawayama et al. ............ 73/861.24
4,258,565 3/1981 Sawayama et al. ............ 73/DIG. 4

FOREIGN PATENT DOCUMENTS 54-68681 6/1979 Japan ............... 73/861.24
55-80018 6/1980 Japan ............... 73/DIG. 4

Primary Examiner—Herbert Goldstein
Attorney, Agent, or Firm—Moonray Kojima

[57] ABSTRACT

A vortex flow metering apparatus comprising a sensor unit having first and second piezoelectric sensors selectively arranged in the concavity or a vortex generator having a measured fluid produce a Karman's vortex according to its velocity, a first conversion amplifier to which a signal from the first piezoelectric sensor is applied, a second conversion amplifier to which a signal from the second piezoelectric sensor is applied, an operator circuit to which outputs from the first and second conversion amplifiers are applied and which through addition or subtraction and other operations, removes noise components due to disturbance vibrations. The first and second piezoelectric sensors are selectively arranged at two points whereat stress distribution of the noise component due to disturbance vibration and stress distribution of a signal component due to vortex dynamic lift are different from each other. The invention thus has an unexpectedly high signal to noise ratio, and extraneous noise due to a variety of disturbance vibrations, is substantially eliminated.

6 Claims, 11 Drawing Figures

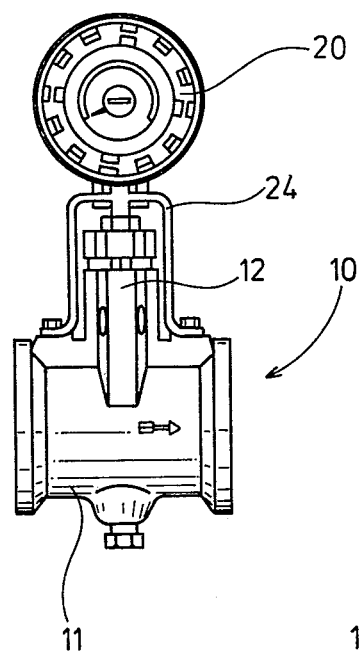
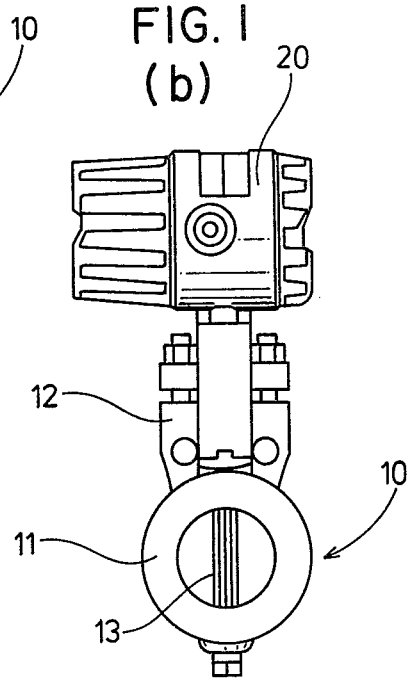

(a)

(b)

STRESS (c)

STRESS

VORTEX FLOW METERING APPARATUS

BACKGROUND OF THE INVENTION

1. Field of Invention

This invention relates to a vortex flow metering apparatus to measure the velocity or quantity of a fluid by utilizing Karman's vortex.

2. Description of the Prior Art

It is well known that inserting an object into a fluid causes vortexes to arise alternately and regularly from both rear sides of the object in a flow downstream. The vortex flow is called Karman's vortex flow, and is a well known phenomenon. The number of vortexes (vortex generation frequency) generated in a unit time is proportional to the velocity of the fluid. A number of prior art devices employ this principle to measure the velocity, for example, of a fluid flow. For example, U.S. Pat. No. 4,248,098, discloses a vortex flow metering apparatus which operates to measure the velocity or quantity of a fluid by a method wherein a vortex generator is arranged in a line to introduce a measuring fluid, and a stress change according to a dynamic lift change resulting from the vortex generation is detected on a single piezoelectric sensor provided on the vortex generator (or receiver), and then subjected to a signal transformation. However, disadvantageously, this type of prior art vortex flow metering apparatus may be adversely affected or influenced, for example, by disturbance vibration, such as piping vibration caused by operation of the pump.

The disturbance vibration may touch off vibration of the vortex generator (or receiver), thereby resulting in vibration of the measuring equipment, including a converter circuit which is usually mounted on the line. When the vortex generator (or receiver) vibrates, a bending moment according to distribution of mass works on the vortex generator (or receiver). When the equipment vibrates, a strain arises on the line, and that strain will produce a bending moment on the vortex generator (or receiver). As a result, there is detected on the single piezoelectric sensor a phenomenon wherein one noise component produced by the bending moment due to the vibration of the vortex generator (or receiver) and another noise component produced by the bending moment due to the line strain, overlap with a signal component produced by the bending moment due to dynamic lift of the vortex. Thus, the conventional prior art vortex flow metering apparatus which uses only one piezoelectric sensor is disadvantageously subject to noise influence due to the disturbance vibration. Consequently, the signal to noise ratio (S/N) deteriorates, especially at low velocities. Thus, there is a deficiency in the prior art, and a great need exists for a vortex flow metering apparatus which can effectively eliminate the noise due to disturbance vibrations.

SUMMARY OF THE INVENTION

The instant invention provides a vortex flow metering apparatus having a superior S/N ratio and unexpectedly improved resistance to vibration noises. The novel apparatus provides two piezoelectric sensors selectively positioned along the axis of the a vortex generator. The selective positioning is determined by taking into account the fact that there is a difference between stress distribution of a signal component arising from vortex dynamic lift and stress distribution of noise component arising from disturbance vibration. The output of each piezoelectric sensor is supplied to a conversion amplifier for processing, and then the outputs of the two amplifiers are supplied to an operator circuit for appropriate addition or subtraction operation. In this manner the noise due to the disturbance vibration is effectively removed, and the output signal from the apparatus is the desired measurement not contaminated by noise.

BRIEF DESCRIPTION OF DRAWINGS

FIGS. 1(a) and 1(b) are outline views of an illustrative embodiment of the invention;

DETAILED DESCRIPTION OF THE PREFERRED EMBODIMENTS

Figure 2:
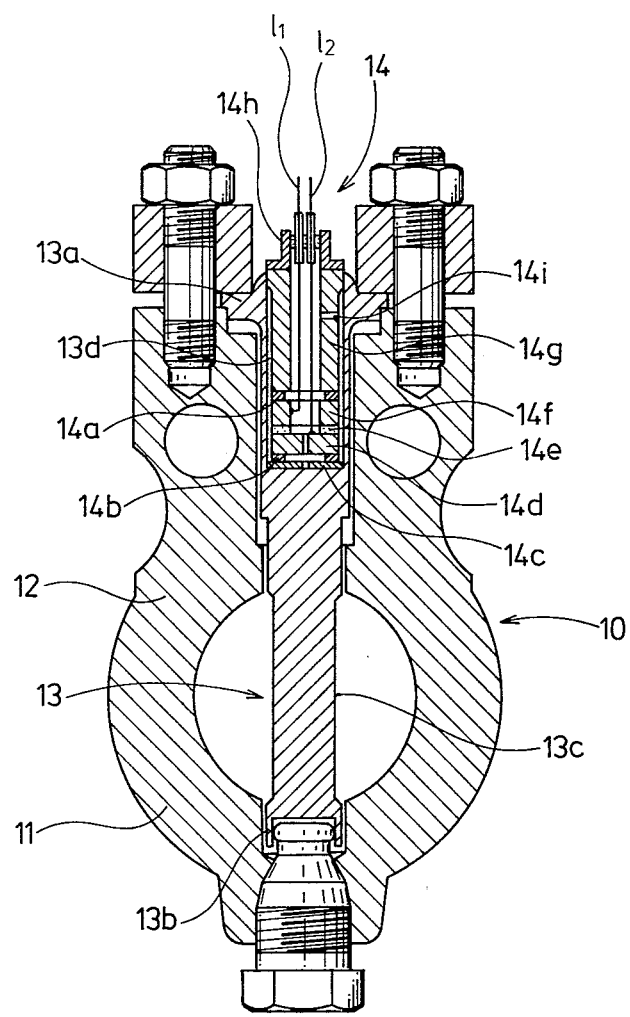
FIG. 2 is a more detailed sectional view of the detector unit of the embodiment.
Figure 3:
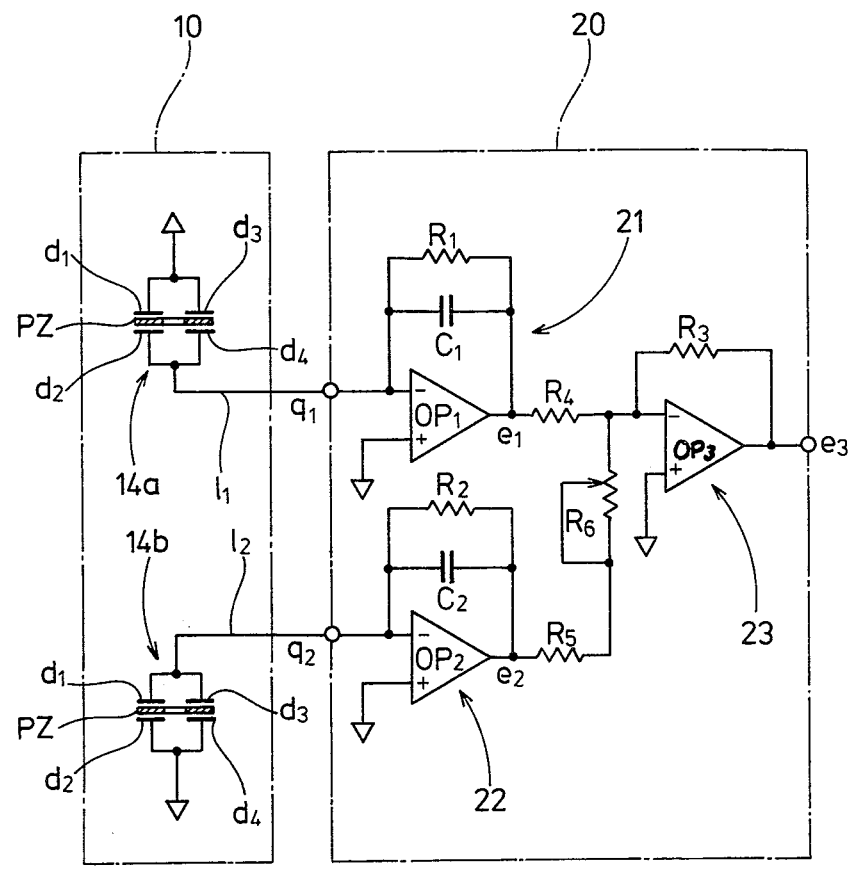
FIG. 3 depicts an electrical circuit diagram of the conversion unit of the embodiment.

FIG. 1 shows the surface appearance of one illustrative embodiment of the invention, which shows a vortex flow metering apparatus. FIG. 1(a) is a front view of such embodiment; and FIG. 1(b) is a side view thereof. FIG. 2 depicts a sectional detailed view of the detecting unit of the embodiment. FIG. 3 is an electrical diagram of the converter unit. The vortex flow metering apparatus comprises a detector unit 10 and a converter unit 20, as depicted in FIG. 1.

In the vortex flow metering apparatus, detector unit 10 is employed with a duct 11 through which fluid flows and which fluid flow is to be measured in velocity and/or quantity. The flow direction is shown by the arrow. A cylindrical nozzle 12 is provided perpendicularly to the duct 11 with a columnar vortex generator 13 (see FIG. 2) inserted perpendicularly into the duct 11 through nozzle 12. The detector unit 10 and the converter unit 20 are attached by means of frame 24, as depicted. The generator 13 (see FIG. 2) comprises stainless steel with its upper end 13a fixed on the nozzle 12 with a screw or by means of a weld, and the lower end 13b is supported on duct 11 with a screw. A portion 13c whereat the vortex generator 13 comes in contact with the measuring fluid, is trapezoidal in section, preferably, for example, so as to generate Karman's vortex flow of the measured fluid, and also to stabilize and strengthen dynamic lift. A concavity 13d is provided on the upper end 13a side. A sensor unit 14 is fit within the concavity 13d and comprises a first piezoelectric sensor 14a and a second piezoelectric sensor 14b positioned and fixed at a selected interval and position in the concavity 13d of the vortex generator 13. The placement of the two sensors will be discussed further hereinbelow, and constitutes an important part of the invention. In contrast to the prior art conventional meters, our invention employes the two piezoelectric sensors and positions them in such a manner that the output signal and measurement is relatively free from noise due to the different vibrational disturbances.

In the sensor unit 14, a pad 14c of stainless steel functions as a buffer for the second piezoelectric sensor 14b and the bottom of the concavity 13d. The pad 14c also evens out the roughness of the bottom of the concavity 13d. A first spacer 14d of stainless steel, an insulating plate 14e of ceramic, and a second spacer 14f of stainless steel are positioned between the two piezoelectric sensors 14a and 14b and can be suitably adjusted to suitably determine and control the distance between the first and second piezoelectric sensors, and also functions to insulate both from each other. A push rod 14g of stainless steel is welded on the upper end 13a of the vortex generator 13 and acts to position the sensors 14a and 14b within the concavity 13d. The sensor unit 14 comes in contact with vortex generator 13 only at pad 14c and the top of push rod 14g. The piezoelectric sensors 14a and 14b comprise a disk piezoelectric element PZ and are arranged so that the center will substantially coincide with the neutral axis of the vortex generator 13.

Figure 4:
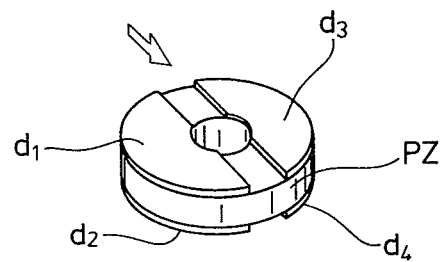
FIGS. 4(a), and 4(b) and 4(c) are outline views of a piezoelectric sensor used in the embodiment.
Figure 4:
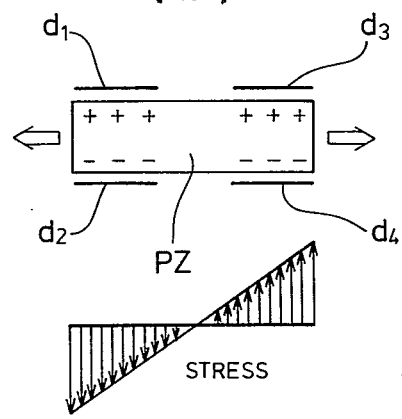
Figure 4:
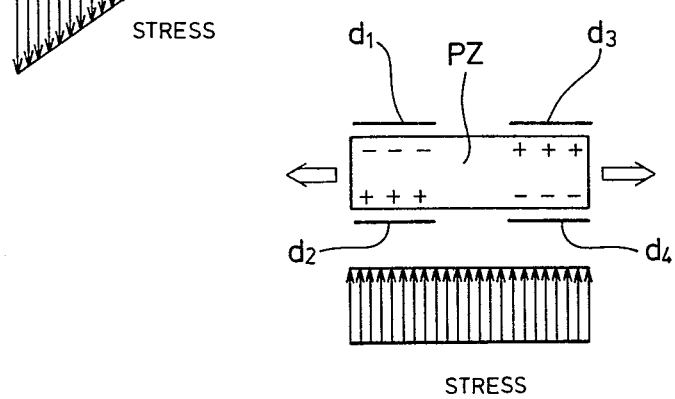

As shown in perspective view in FIG. 4(a), the piezoelectric element PZ is provided with electrodes $d_1$, $d_2$, $d_3$, and $d_4$ at front and rear, which are given symmetrically in division left and right to the direction (the direction being illustrated by an arrow) in which the measured fluid flows and also polarized inversely so that a charge arising between electrodes $d_1$ and $d_2$ and a charge arising between electrodes $d_3$ and $d_4$ will be of a polarity corresponding to stresses (compression stress and tensile stress) working counter to each other on a neutral axis, according to bending moments due to forces arising in the direction (dynamic lift direction of the vortex) indicated by arrows, as shown in FIG. 4(b). Thus, charges which are reverse in polarity, are produced between both sets of electrodes when stresses arise in the same direction as shown in FIG. 4(c). A charge arising according to the stress of the direction in which the measured fluid flows is cancelled between the electrodes and disappears. Charges arising from a piping vibration in the flow direction, are also cancelled mutually between the electrodes and disappear.

Figure 5:
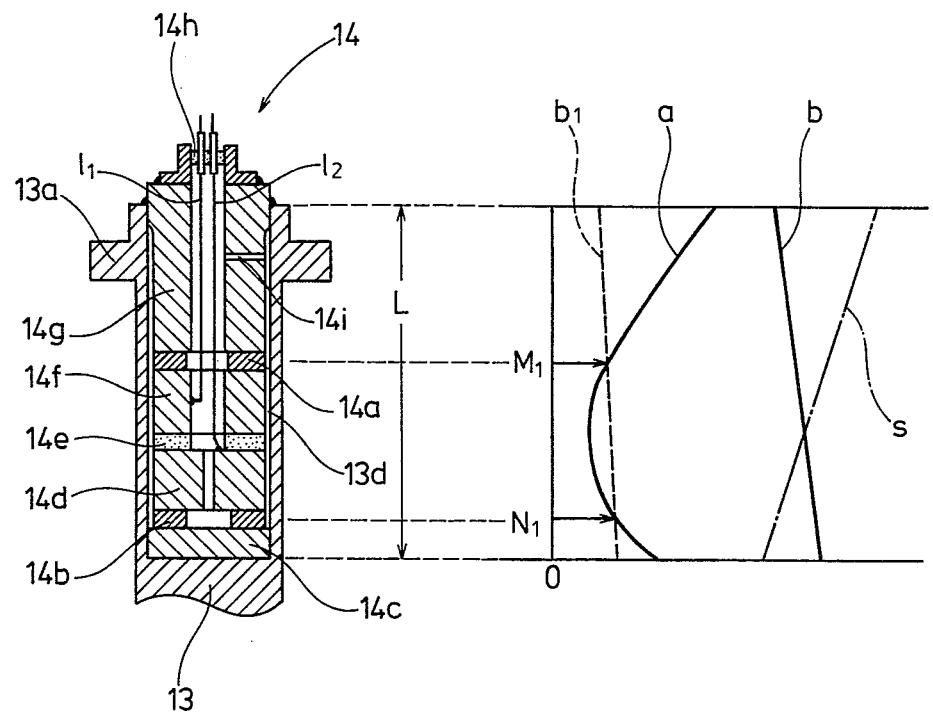
FIGS. 5 and 6 depict characteristic curves of the different noise factors and the distribution along the axis of the vortex generator.
Figure 7:
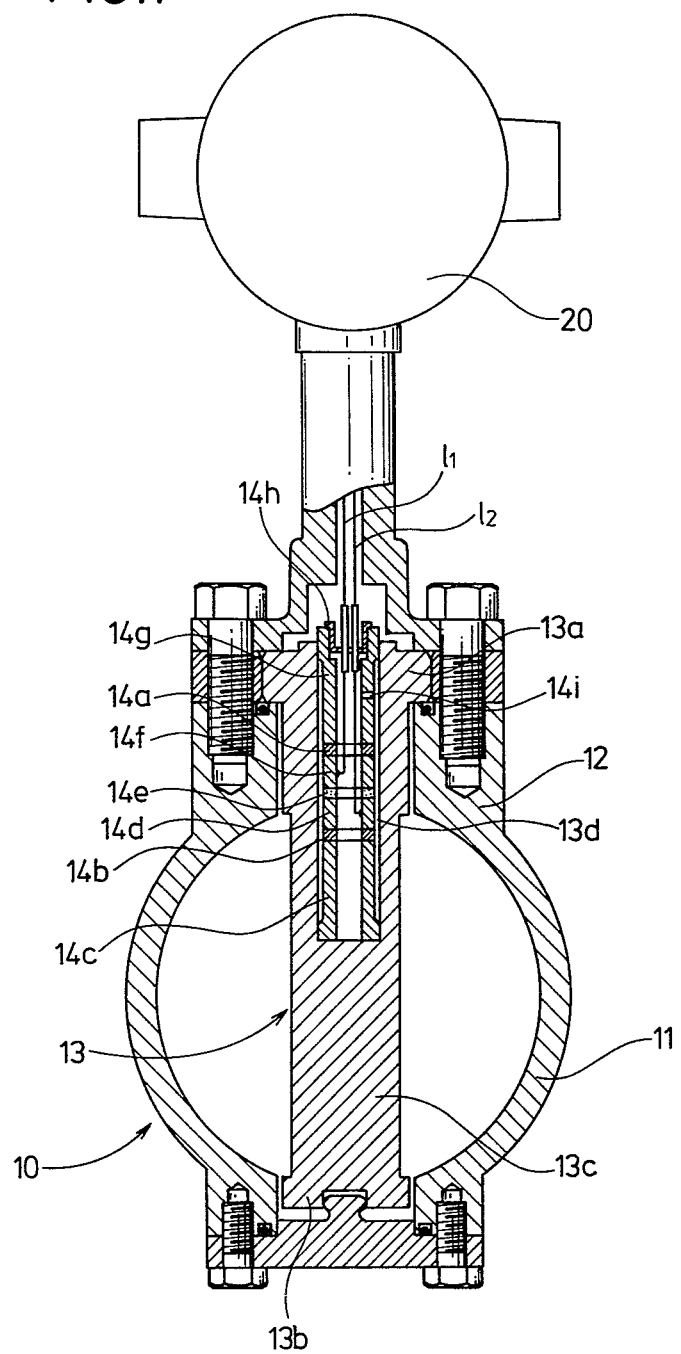
FIG. 7 depicts a side elevation view of another illustrative embodiment.

As shown in FIGS. 2, 5 and 7, the first piezoelectric sensor 14a has electrodes $d_1$ and $d_3$ connected in common to the vortex generator 13, or a reference point through push rod 14g; and has electrodes $d_2$ and $d_4$ connected in common to lead wire $l_1$ through spacer 14f, so as to cancel charges of reverse polarity with the sum of charges of a polarity arising between electrodes $d_1$, $d_2$ and electrodes $d_3$ and $d_4$, as an output charge $q_1$. The second piezoelectric sensor 14b has electrodes $d_1$ and $d_3$ connected in common to a lead wire $l_2$ through spacer 14d and electrodes $d_2$ and $d_4$ connected in common to vortex generator 13 or a reference point through pad 14c, so as to cancel charges reverse in polarity with the sum of charges of a plarity arising between electrodes $d_1$ and $d_2$, and electrodes $d_3$ and $d_4$, as an output charge $q_2$ and also to invert the polarity with $q_1$.

The lead wires $l_1$ and $l_2$ are taken out externally through a hole and a hermetic seal 14h is provided on each part of sensor unit 14 and connected to a vortex flow meatering apparatus converter unit 20. The concavity 13d of the vortex generator 13 and a portion surrounded by sensor unit 14 are charged with a gas having a low dew point for antidewing effect, and a through hole 14i for charging gas therethrough, is provided in push rod 14g. The thickness and material of each part of the sensor unit 14, are selected suitably so that an inital push stress will be free from change due to temperature changes.

The vortex flow metering apparatus converter 20 (see FIGS. 1 and 3) has two conversion amplifiers 21 and 22, and an operator circuit 23, to carry out addition or subtraction of the output signals from amplifiers 21 and 22. As for the conversion amplifiers 22 and 21, each comprises an operation amplifier $OP_1$ ($OP_2$) and a parallel circuit comprising a condenser $C_1$ ($C_2$) and a resistance $R_1$ ($R_2$) which is connected to a feedback circuit of $OP_1$ ($OP_2$). The lead wire $l_1$ is connected to an inversion input terminal (−) of the operation amplifier $OP_1$ and the lead wire $l_2$ is connected to an inversion input terminal (−) of operation amplifier $OP_2$. Operator circuit 23 comprises an operation amplifier $OP_3$ for which feedback is applied by a resistance $R_3$, which is indicated in that of carrying out an addition of an output voltage $e_1$ of the converter 21 which is applied to an inversion input terminal (−) of $OP_3$ through an operation resistance $R_4$ and an output $e_2$ of the conversion amplifier 22 which is applied through a series circuit of a resistance $R_5$ and a variable resistance $R_6$, as depicted.

Operation of the inventive apparatus will now be described with reference to FIG. 5. When the measured fluid flows in duct 11, vortex generator 13 generates Karman's vortex and is also subjected to a dynamic lift change according to generation of the vortex. When the vortex generator 13 is subjected to a dynamic lift, a bending moment MV according to the dynamic lift works on the sensors of unit 14, and there is produced a stress distribution which is almost linear, as shown as curve S in FIG. 5, in the interior. Then, a stress value in FIG. 5 is indicated in a charge detected on the piezoelectric sensor. The vortex generator 13 is then subjected to a force in the same direction as a dynamic lift of the vortex by a distrubance vibration excited, for example by a pump used to move the fluid in duct 11. The force according to the disturbance vibration includes one mode created by the vibration of the vortex generator 13 and another mode created by a duct strain according to the vibration of the measuring equipment, and bending moment $Ma_1$ and $Ma_2$, operate on the sensor unit 14 according to each mode. There is produced a stress distribution, such as in the nature of curve a in FIG. 5, in the sensor unit 14 by action of the moment $Ma_1$ according to the vibration of the vortex generator 13. There is also produced a stress distribution which is almost linear, such as in the nature of curve b in FIG. 5 in sensor unit 14 by action of mement $Ma_2$ according to the duct strain. As a result, charges $q_1$ and $q_2$ detected on piezoelectric sensors 14a and 14b have each signal charge according to the dynamic lift of the vortex overlapped with a noise charge due to the vibration of the vortex generator and another noise charge due to the duct strain.

Thus, assume that the amplitudes of the signal charges according to the dynamic lift of the vortex is $S_1(\omega)$, $S_2(\omega)$; that the amplitudes of the noise charges according to the vibration of the vortex generator 13 is $N_{a1}(\omega')$, $N_{a2}(\omega')$, and that the amplitudes of the noise charges according to the duct strain is $N_{b1}(\omega')$ ($N_{b2}(\omega')$. Then, the following equations will hold true:

$$q_1 = S_1(\omega)\, \omega \sin\, \omega t + \{N_{a1}(\omega') \sin\, \omega' t + N_{b1}(\omega') \sin\, (\omega' t + \phi(\omega'))\} \quad (1)$$

$$q_2 = S_2(\omega) \sin\, \omega t + \{N_{a2}(\omega') \sin\, \omega' t + N_{b2}(\omega') \sin\, (\omega' t + \phi(\omega'))\} \quad (2)$$

wherein $\omega$ = angular frequency of signal charge.

$\omega'$ = angular frequency of noise charge.

$\phi(\omega')$ = phase difference between noise charges.

In equations (1) and (2), the amplitudes of the signal charges $S_1(\omega)$ and $S_2(\omega)$ change according to the dynamic lift of the vortex or vortex generation frequency. Then, the amplitudes of the noise charges $N_{a1}(\omega')$, $N_{a2}(\omega')$, $N_{b1}(\omega')$ and $N_{b2}(\omega')$ and the phase difference $\phi(\omega')$ also change according to acceleration and frequency of disturbance vibration. However, the ratios of amplitudes $N_{a2}(\omega')/N_{a1}(\omega')$ and $N_{b2}(\omega')/N_{b1}(\omega')$ are constant and are free from influence of acceleration and frequency of disturbance vibration. Furthermore the ratio $N_{b2}(\omega')/N_{b1}(\omega')$ is constant regardless of change in weight of the equipment. Where the equipment is large compared with that of the vortex generator 13, such as depicted in FIG. 1, the noise charge according to the vibration of the vortex generator 13 is satisfactorily smaller than the noise charge according to the duct strain. Then, points $M_1$ and $N_1$ (see FIG. 5) whereat the piezoelectric sensors 14a and 14b are selectively positioned, are so selected, that the ratio of amplitudes of the signal charges and the ratio of amplitudes of the noise charges are different from each other, and that, as depicted in FIG. 5, a distribution curve a of noise charge due to vibration of vortex generator 13, and a distribution line $b_1$ analogous (ratios of amplitudes at arbitrary two points being equal), to a distribution line b of noise charge due to the duct strain, intersect each other. Thus, the ratio of amplitudes of noise charges due to vibration of vortex generator 13, and the ratio of amplitudes of noise charges due to duct strain are equal and satisfy the relationship given by the following equation:

$$\lambda_1 = \frac{N_{a2}(\omega')}{N_{a1}(\omega')} = \frac{N_{b2}(\omega')}{N_{b1}(\omega')} \quad (3)$$

Figure 6:
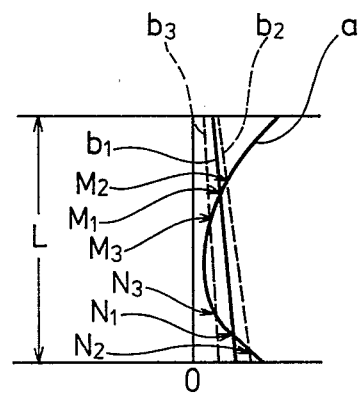
Figure 8:
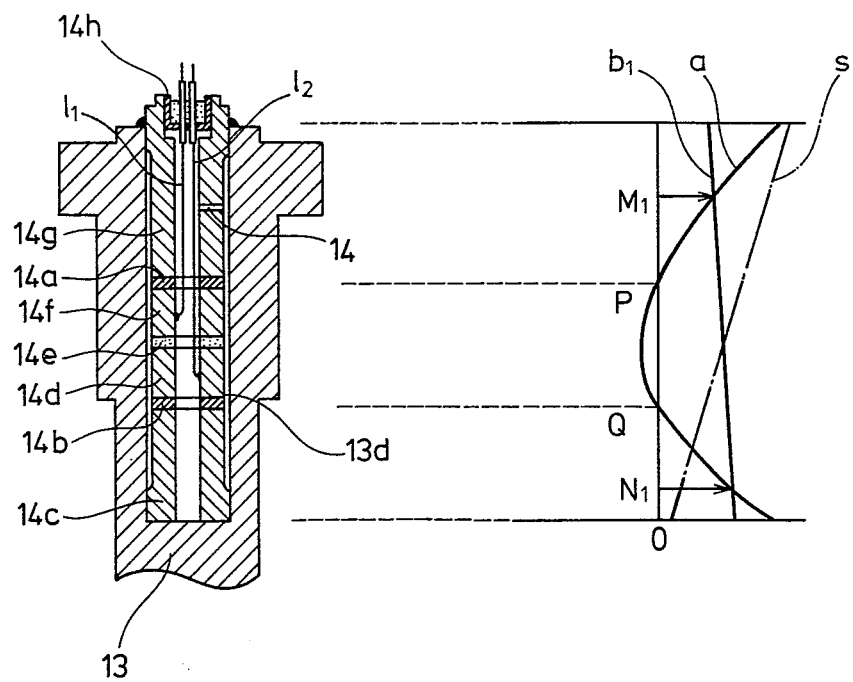
FIG. 8 depicts a characteristic curve of different noise factors and the distribution along the axis of the vortex generator of FIG. 7.

Then, the two points satisfying the above relationship can be combined in various ways. For example, combinations are conceivable from taking points $M_2-N_2$ and $M_3-N_3$, whereat the distribution lines $b_2$ and $b_3$, analogous to distribution line b of noise charges due to duct strain, and distribution curve a of noise charges due to vibration of vortex generator 13, intersect each other, as shown, for example, in FIG. 6. Then, the distribution curve a of noise charges due to vibration of vortex generator 13, changes according to size and shape of the vortex generator 13, and sensor unit 14 (such as shown in FIG. 5, in the case of detector 10 having a considerably long nozzle 12, as shown in FIG. 1). The distribution curve a may be different, such as shown in FIG. 8 having two points (P,Q) whereat the noise charges become substantially zero, in the case, for example, of a detector having a comparatively short nozzle 12, such as shown in FIG. 7. However, there exists in any case, two points $M_1$ and $N_1$, whereat the relations given in the above equations (1) (2) and (3) are satisfied and the ratio of amplitudes of signal charges and ratio of amplitudes of noise charges are different.

The output charge $q_1$ of piezoelectric sensor 14a is applied to conversion amplifier 21 (see FIG. 3), and the output charge $q_2$ of piezoelectric sensor 14b is applied to conversion amplifier 22 through inversion. Both are converted into AC voltages $e_1$ and $e_2$ and then applied to the input of operator circuit 23. The operator circuit 23 adds $e_1$ and $e_2$, and its own output $e_3$ is given by the following equation:

$$e_3 = \frac{R_3}{R_4} e_1 = \frac{R_3}{R_5 + R_6} e_2 \quad (4)$$

Let the gains of the conversion amplifiers 21 and 22, be $K_1$ and $K_2$, then $e_3$ will be given as follows from equations (1) and (2):

$$e_3 = K\left\{ S_1(\omega)\left(1 - \frac{R_4}{R_5 + R_6} \cdot \frac{K_2}{K_1} \cdot \frac{S_2(\omega)}{S_1(\omega)}\right) \sin\omega t + \right.$$

$$(\omega')\left(1 - \frac{R_4}{R_5 + R_6} \cdot \frac{K_2}{K_1} \cdot \frac{N_{a2}(\omega')}{N_{a1}(\omega')}\right) \sin\omega' t +$$

$$\left. (\omega')\left(1 - \frac{R_4}{R_5 + R_6} \cdot \frac{K_2}{K_1} \cdot \frac{N_{b2}(\omega)}{N_{b1}(\omega)}\right) \sin(\omega' t + \phi(\omega)) \right\} \quad (5)$$

$$\text{wherein } K = \frac{R_3}{R_4} K_1$$

In equation (5), $N_{a2}(\omega')/N_{a1}(\omega')$ and $N_{b2}(\omega')/N_{b1}(\omega')$ are selected so as to satisfy the relationship in equation (3). Thus, from satisfying $$1 - \frac{R_4}{R_5 + R_6} \cdot \lambda_1 \frac{K_2}{K_1} = 0 \quad (6)$$

by adjusting variable resistance $R_6$, the output $e_3$ of the operator 23 is obtained as $$e_3 = KS_1(\omega)\left(1 - \frac{S_2(\omega)}{S_1(\omega)} \cdot \frac{1}{\lambda_1}\right) \sin\omega t \quad (7)$$

thus removing effectively influence of noises due to disturbance vibration. As a result, the present invention is unexpectedly effective in improving the S/N ratio by 10 times or more, as compared with a conventional prior art vortex flow metering apparatus using only one piezoelectric sensor. As described in U.S. Pat. No. 4,201,084, for example, the operator output $e_3$ is converted into a pulse signal after passing a filter circuit of low-pass characteristic, and the pulse signal is transmitted to a receiving side directly through a channel or a pair of channels after conversion into a DC signal.

As for noise charges due to the vibration of the vortex generator 13, there may be obtained two points (P,Q), whereat the charges become zero as shown in the distribution curve a in FIG. 8 from selecting size and shape of the vortex generator 13 and the sensor unit 14 as shown in FIG. 7. The positions of the two points do not change according to acceleration and frequency of the disturbance vibration, and the ratio of amplitudes of the signal charges and the ratio of amplitudes of the noise charges are different at the points P,Q. Therefore, if the piezoelectric sensors 14a and 14b are arranged at the two points (P,Q) whereat the noise charges due to the vibration of the vortex generator 13 become zero in the sensor unit 14, the noise component comes only in the noise charges due to the duct strain. The output charges $q_1$ and $q_2$ of the piezoelectric sensors 14a and 14b will be given respectively by the following equations:

$$q_1 = S_1(\omega) \sin \omega t + N_{b1}(\omega') \sin(\omega' t + \phi(\omega')) \quad (8)$$

$$q_2 = S_2(\omega) \sin \omega t + N_{b2}(\omega') \sin (\omega't = \phi(\omega')) \tag{9}$$

Therefore, the output $e_3$ of the operator circuit 23 is given as:

$$e_3 = K \left\{ S_1(\omega) \left( 1 - \frac{R_4}{R_5 + R_6} \cdot \frac{K_2}{K_1} \cdot \frac{S_2(\omega)}{S_1(\omega)} \right) \sin\omega t + \right. \tag{10}$$

$$\left. N_{b1}(\omega') \left( 1 - \frac{R_4}{R_5 + R_6} \cdot \frac{K_2}{K_1} \cdot \frac{N_{b2}(\omega')}{N_{b1}(\omega')} \right) \sin(\omega' t + \phi(\omega')) \right\}$$

and since the ratio of amplitudes of noise charges $N_{b2}(\omega')/N_{b1}(\omega')$ is constant, $(\lambda_2)$, from satisfying:

$$1 - \frac{R_4}{R_5 + R_6} \cdot \frac{K_2}{K_1} \cdot \lambda_2 = 0 \tag{11}$$

by adjusting variable resistance $R_6$, the output $e_3$ of the operator circuit 23 becomes $$e_3 = KS_1(\omega) \left( 1 - \frac{1}{\lambda_2} \cdot \frac{S_2(\omega)}{S_1(\omega)} \right) \sin\omega t \tag{12}$$

thus removing effectively influence of noises due to disturbance vibration.

Furthermore, in the construction shown above in FIG. 1, where the equipment is large as compared with that of vortex generator 13, noise charges due to the vibration of the vortex generator, are satisfactorily smaller than noise charges due to the duct strain. Thus, influence of noise charges due to vibration of the vortex generator 13 can be neglected, and influence of noise component due to the disturbance vibration can effectively be removed by selecting the position of the two piezoelectric sensors 14a, and 14b at two points where the ratio of amplitudes of the signal charges $S_2(\omega)/S_1(\omega)$ and the ratio of noise charges due to the duct strain $N_{b2}(\omega')/N_{b1}(\omega')$ are different from each other in the sensor unit 14.

Then, the description given above has referred, for example, to the case wherein a value of the variable resistance $R_6$ is adjusted to satisfy equations (6) and (11). However, gains $K_1$ and $K_2$ of conversion amplifiers 21 and 22 can be adjusted otherwise. The case where the output $3_1$ of amplifier 21 and output $e_2$ of amplifier 22 are added in operator circuit 23, has been described. If noise components of output charges of piezoelectric sensors 14a, and 14b, are in phase, then these will be subjected to subtraction in operator circuit 23. Furthermore, in the case where output charges of piezoelectric sensors 14a and 14b are utilized as illustrated above, an output voltage can be also utilized. For conversion amplifiers 21 and 22, in this case, a voltage amplifier is used instead of a change amplifier. Then, the case where piezoelectric sensor elements polarized inversely are used for the piezoelectric sensors 14a and 14b, as has been illustrated hereinbefore. However, piezoelectric elements not polarized inversely can also be used with appropriate changes made, such as the elements being separated into those of left and right and then mounted with one part turned over to obtain an inversely polarized type essentially, or insulating plates be provided between the first piezoelectric sensor 14a and the push rod 14g, and the second piezoelectric element 14b, with electrodes $d_1$, $d_3$ and $d_2$, $d_4$ being connected suitably and a lead wire being connected to electrodes $d_1$ and $d_3$.

As described above, according to the instant invention, a vortex flow metering apparatus having superior S/N ratio and improved for vibration resistance is obtainable by a suitable construction, wherein a sensor unit provided in the convavity of a vortex generator is arranged with two piezoelectric sensors at selected locations in the concavity, with the locations taking into account the fact that there is a difference between the stress distribution of a signal component arising from vortex dynamic lift, and stress distribution of a noise component arising from a disturbance vibration. Each sensor output is subjected to processing in a respective converter amplifier, and then the processed signal is sent to an operator circuit, thereby to effectively remove noise due to distubrance vibration.

The foregoing description is illustrative of the principles of the invention. Numerous extension and modifications thereof would be apparent to the worker skilled in the art. All such extensions and modifications are to be considered to be within the spirit and scope of the invention.

What is claimed is:

1. A vortex flow metering apparatus, comprising converter means, said converter means comprising
   a first conversion amplifier having an input and an output,
   a second conversion amplifier having an input and an output,
   an operator circuit having an input and an output, and
   means for connecting said outputs of said first conversion amplifier and of said second conversion amplifier to said input of said operator circuit;
   detector means, said detector means comprising
   a vortex generator having an axis and defining a concavity,
   a first piezoelectric sensor disposed within said concavity,
   a second piezoelectric sensor disposed within said concavity,
   means for connecting said first piezoelectric sensor to said input of said first conversion amplifier, and
   means for connecting said second piezoelectric sensor to said input of said second conversion amplifier; and
   wherein said first piezoelectric sensor and said second piezoelectric sensor are selectively arranged at to points along said axis of said vortex generator whereat ratio of noise component due to vibration of said vortex generator according to disturbance vibration and ratio of noise component due to duct strain according to disturbance vibration are substantially equal, and ratio of signal component due to vortex dynamic lift and ratio of signal component due to disturbance vibration are different from each other, whereby signals from said first and second piezoelectric sensors are applied to said inputs of said first and second amplifiers, and after processing thereat, supplied to said input of said operator circuit, thereby to remove noise components caused by disturbance vibrations.

2. The apparatus of claim 1, wherein said first and second piezoelectric sensors each comprise a disk piezoelectric element, said element being provided with electrodes at front and rear sides thereof, said electrodes each being symmetrically divided into left and right portions as positioned with respect to a direction of flow of fluid to be measured.

3. The apparatus of claim 2, wherein said piezoelectric elements are polarized inversely so that a charge arising between said left portion electrodes and a charge arising between said right portion electrodes become the same polarity when stress is applied to a left portion of said element is of an opposite direction as stress applied to a right portion of said element.

4. A vortex flow metering apparatus comprising sensing means having first and second piezoelectric sensors fixed in the cavity of a vortex generator having a measuring fluid produce a Karman's vortex according to its velocity, a first conversion amplifier to which a signal from said first piezoelectric sensor is applied, a second conversion amplifier to which a signal from said second piezoelectric sensor is applied, and an operator circuit to which outputs from said first and second conversion amplifiers are applied and which performs an operation to remove noise components caused by disturbance vibrations; and wherein said first and second piezoelectric sensors are selectively arranged at two points along an axis of said vortex generator whereat ratio of noise component due to vibration of said vortex generator according to disturbance vibration is substantially equal to ratio of noise component due to duct strain according to disturbance vibration, and ratio of signal component due to vortex dynamic lift and ratio of signal component due to disturbance vibration are different from each other.

5. A vortex flow metering apparatus comprising sensing means having first and second piezoelectric sensors fixed in the concavity of a vortex generator having a measuring fluid produce a Karman's vortex according to its velocity, a first converstion amplifier to which a signal from said first piezoelectric sensor is applied, a second conversion amplifier to which a signal from said second piezoelectric sensor is applied, and an operator circuit to which outputs from said first and second conversion amplifiers are applied and which performs an operation to remove noise components caused by disturbance vibrations; and wherein said second piezoelectric sensor is laid on a metal pad placed in the bottom of said concavity of said vortex generator, said first piezoelectric sensor is laid on said second piezoelectric sensor by placing a first metal spacer, an insulating plate, and a second space between said first and second piezoelectric sensors, and a metal push rod is welded on an upper end of said vortex generator and acts to position said first and second piezoelectric sensors within said concavity of said vortex generator.

6. The apparatus of claim 5, wherein said first piezoelectric sensor comprises a first piezoelectric element and electrodes disposed on an upper surface of said first piezoelectric element and connected to said vortex generator through said push rod, and electrodes disposed on a lower surface of said piezoelectric element and connected to one lead wire through said second spacer; and wherein said second piezoelectric sensor comprises a second piezoelectric element and electrodes disposed on an upper surface of said second piezoelectric element and connected to another lead wire through said first spacer, and electrodes disposed on a lower surface of said second piezoelectric element and connected to said vortex generator through said pad.

* * * * *